(12) United States Patent
Zhang et al.

(10) Patent No.: US 12,345,687 B1
(45) Date of Patent: Jul. 1, 2025

(54) METHOD AND APPARATUS FOR CLASSIFYING WATER-RICH WEAK SURROUNDING ROCK BASED ON IN-SITU SCRIBING

(71) Applicants: CHINA UNIVERSITY OF MINING AND TECHNOLOGY, BEIJING, Beijing (CN); Center for Hydrogeology and Environmental Geology Survey, CGS, Tianjin (CN)

(72) Inventors: Fawang Zhang, Tianjin (CN); Liu Yang, Beijing (CN); Manchao He, Beijing (CN); Chengyu Miu, Beijing (CN); Zhehan Yu, Beijing (CN); Guangtao Dong, Beijing (CN); Benchao Xu, Beijing (CN); Fei Gong, Beijing (CN); Shulin Zhang, Beijing (CN); Jiawei Cai, Beijing (CN)

(73) Assignees: CHINA UNIVERSITY OF MINING AND TECHNOLOGY, BEIJING, Beijing (CN); Center for Hydrogeology and Environmental Geology Survey, CGS, Tianjin (CN)

( * ) Notice: Subject to any disclaimer, the term of this patent is extended or adjusted under 35 U.S.C. 154(b) by 0 days.

(21) Appl. No.: 19/026,687

(22) Filed: Jan. 17, 2025

(30) Foreign Application Priority Data

Apr. 29, 2024 (CN) .......................... 202410525232.2

(51) Int. Cl.
*G01N 3/42* (2006.01)
*G01N 21/3554* (2014.01)
*G01N 21/359* (2014.01)

(52) U.S. Cl.
CPC ........... *G01N 3/42* (2013.01); *G01N 21/3554* (2013.01); *G01N 21/359* (2013.01);
(Continued)

(58) Field of Classification Search
CPC .... G01N 3/42; G01N 21/3554; G01N 21/359; G01N 2203/0244; G01N 2203/0676;
(Continued)

(56) References Cited

U.S. PATENT DOCUMENTS

2022/0155196 A1* 5/2022 Xue ....................... G01N 33/24
2024/0110479 A1* 4/2024 Zhang .................... E21F 17/18

FOREIGN PATENT DOCUMENTS

CN          118643374 A   *   9/2024

\* cited by examiner

*Primary Examiner* — Brandi N Hopkins
(74) *Attorney, Agent, or Firm* — Bayramoglu Law Offices LLC (57) ABSTRACT

A method and apparatus for classifying water-rich weak surrounding rock based on in-situ scribing are provided. The method includes placing a scribing device on tunnel cross-sections of varying lengths; performing in-situ scribing on the tunnel cross-sections to obtain the mechanical parameters of the surrounding rock and determining the surrounding rock strength at different locations; while performing in-situ scribing, employing near-infrared spectroscopy to simultaneously measure the in-situ spectrum of the tunnel surrounding rock, thereby determining the surface water content at different locations; based on the scribing mechanical parameters of the tunnel surrounding rock, establishing a scribing depth curve, and calculating a joint development degree of the tunnel surrounding rock at different locations from the scribing depth curve; and based on the surrounding rock strength, surface water content, and joint development degree of the tunnel surrounding rock at different locations, classifying the surrounding rock grades of the tunnel cross-section.

20 Claims, 7 Drawing Sheets

(52) U.S. Cl.
CPC ............... *G01N 2203/0244* (2013.01); *G01N 2203/0676* (2013.01); *G01N 2203/0682* (2013.01)

(58) Field of Classification Search
CPC .. G01N 2203/0682; G01N 29/07; G01N 3/08; G01N 3/00; G01N 29/0654; G01N 33/24; G01N 3/02; G01N 3/12; G01N 19/00; G01N 3/56; G01N 25/14; G01N 3/313; G01N 29/34; G01N 3/36; G01L 5/00; G01L 1/242; G01V 1/00; E21F 17/18; E21D 9/00; G01M 99/00
See application file for complete search history.

METHOD AND APPARATUS FOR CLASSIFYING WATER-RICH WEAK SURROUNDING ROCK BASED ON IN-SITU SCRIBING

CROSS-REFERENCE TO THE RELATED APPLICATIONS

This application is based upon and claims priority to Chinese Patent Application No. 202410525232.2, filed on Apr. 29, 2024, the entire contents of which are incorporated herein by reference.

TECHNICAL FIELD

The present invention relates to the technical field of rock tunnel surrounding rock testing, and more particularly, to a method and apparatus for classifying water-rich weak surrounding rock based on in-situ scribing.

BACKGROUND

In the construction of deep soft rock tunnel excavation, water conveyance tunnels, underground chambers, and many deep underground space projects, due to complex topography, great burial depth, and the influence of the heterogeneous characteristics of rock materials, collapses and rockburst accidents occur frequently during tunnel construction, seriously affecting construction progress and personal safety. Current engineering exploration methods mainly adopt direct exploration, drilling, sounding, and geophysical exploration. Limited by the inherent limitations of the above-mentioned detection methods and complex surface conditions, it is not possible to effectively identify all adverse geological conditions along the line during the geological exploration stage. Therefore, carrying out research on the advanced prediction and quantitative identification of the joint distribution characteristics, mechanical properties, and water content of weak surrounding rock in deep water-rich tunnels is of great theoretical significance and engineering value for the safe and stable construction of tunnel projects.

Methods for determining rock mechanical parameters include in-situ field tests and laboratory tests. Common borehole tests involve conducting laboratory experiments on the extracted rock cores to obtain rock mechanical parameters and their distribution characteristics along the borehole. However, due to differences in rock mass lithology distribution and the presence of numerous structural planes, conventional drilling can only be analyzed through drilling speed, returned dill cuttings, and core sampling. Furthermore, the disturbance caused by drilling makes it impossible to continuously and effectively obtain complete rock cores during on-site rock sampling, resulting in discontinuous and highly discrete experimental selection points. Consequently, there is a significant discrepancy between the mechanical characteristics of the rock mass and the mechanical behavior exhibited by laboratory rock specimens, leading to considerable randomness and uncertainty in rock mass test parameters. Therefore, using in-situ tests to determine rock mechanical parameters can better reflect the natural characteristics of the rock mass. Existing in-situ penetration tests are primarily performed as discrete measurements, making it difficult to accurately, systematically, and efficiently obtain continuous variations in the rock mechanical properties and compositional characteristics of the surrounding rock at various locations in the tunnel.

Therefore, how to provide a continuous in-situ rock mechanical property testing method that can perform highly accurate, highly automated, and highly efficient scribing in-situ tests at various positions and directions of large-section water-rich weak surrounding rock, and simultaneously evaluate the joint development degree, rock strength, and water content, and establish a surrounding rock classification method based on in-situ three-parameter measurements, so as to provide a design basis for soft rock tunnel surrounding rock support and large deformation disaster control, is a technical problem that urgently needs to be solved by those skilled in the art.

SUMMARY

Accordingly, the present invention provides a method and apparatus for classifying water-rich weak surrounding rock based on in-situ scribing, in order to solve the problem in the prior art that it is difficult to accurately, systematically, and efficiently obtain the rock mechanical properties and joint development degree of the surrounding rock at various positions of the tunnel due to the fact that the in-situ penetration tests are primarily performed as discrete measurements; in conjunction with the water content inverted from the supporting near-infrared spectral characteristic analysis system, a new three-parameter method is established for the risk level classification of large deformation and water inrush disasters in water-rich soft rock tunnels.

To achieve the aforementioned objectives, the present invention provides the following technical solutions:

According to a first aspect of the present invention, a method for classifying water-rich weak surrounding rock based on in-situ scribing is provided, including the following steps:

Step S1: Obtain the total length of a water-rich weak surrounding rock tunnel and place a scribing device on tunnel cross-sections of varying lengths;

Step S2: Perform in-situ scribing on the tunnel cross-sections using the scribing device to obtain the mechanical parameters of the surrounding rock, and determine the surrounding rock strength at different locations, wherein the mechanical parameters of the surrounding rock include indentation mechanical parameters and scribing mechanical parameters of the surrounding rock;

Step S3: While the scribing device is performing in-situ scribing on the tunnel cross-sections, employ near-infrared spectroscopy to simultaneously measure the in-situ spectrum of the tunnel surrounding rock, and determine the surface water content at different locations;

Step S4: Based on the scribing mechanical parameters of the tunnel surrounding rock, establish a scribing depth curve, and calculate the joint development degree at different locations using the scribing depth curve;

Step S5: Based on the surrounding rock strength, surface water content, and joint development degree at various locations, classify the surrounding rock grades of the tunnel cross-section.

Further, in step S2, determining the surrounding rock strength of the tunnel surrounding rock at different locations, specifically includes:

Calculating an indentation elastic modulus $E_1$ and an indentation hardness $H_1$ according to the indentation mechanical parameters of the surrounding rock; wherein, $$E_1 = (1-v^2) \bigg/ \left(\frac{1}{E_r} + \frac{1-v^2}{E_i}\right), H_1 = P_{max}/A_c;$$

v is the Poisson's ratio, $E_r$ is the reduced elastic modulus, $E_i$ is the indenter elastic modulus, $P_{max}$ is the maximum load, and $A_c$ is the indentation contact area between the vertical indenter and the rock;

Calculating a scribing elastic modulus $E_2$ and a scribing hardness $H_2$ according to the scribing mechanical parameters of the surrounding rock; wherein, $E_2 = dF_t/ds$, $H_2 = F_n/A_d$; $F_t$ is the lateral force, s is the lateral displacement, $F_n$ is the vertical force, and $A_d$ is the scribing contact area between the vertical indenter and the rock;

Calculating a surrounding rock elastic modulus E based on the indentation elastic modulus $E_1$ and the scribing elastic modulus $E_2$; wherein, $E = \sqrt{E_1 E_2}$;

Calculating a surrounding rock hardness H based on the indentation hardness $H_1$ and the scribing hardness $H_2$; wherein, $H = (H_1 + H_2)/2$;

Calculating the surrounding rock strength UCS based on the surrounding rock elastic modulus E and the surrounding rock hardness H; wherein, UCS=E/H.

Further, in step S5, the surrounding rock grades of the tunnel cross-section are classified based on the surrounding rock strength, surface water content, and joint development degree at different locations, according to a three-parameter evaluation model, wherein the three-parameter evaluation model is:

$$SRC = \overline{UCS} \big/ (\overline{DCD} * \overline{C});$$

$$\overline{UCS} = \frac{UCS_i - UCS_{min}}{UCS_{max} - UCS_{min}};$$

$$\overline{DCD} = \frac{DCD_i - DCD_{min}}{DCD_{max} - DCD_{min}};$$

$$\overline{C} = \frac{C_i - C_{min}}{C_{max} - C_{min}};$$

Wherein, SRC is the surrounding rock grade evaluation score, $\overline{UCS}$ is the standard surrounding rock strength, $\overline{DCD}$ is the standard joint development degree, $\overline{C}$ is the standard surface water content, $UCS_i$ is the surrounding rock strength of the tunnel surrounding rock at the i-th position, $UCS_{min}$ is the minimum surrounding rock strength, $UCS_{max}$ is the maximum surrounding rock strength, $DCD_i$ is the joint development degree of the tunnel surrounding rock at the i-th position, $DCD_{min}$ is the minimum joint development degree, $DCD_{max}$ is the maximum joint development degree, $C_i$ is the surface water content of the tunnel surrounding rock at the i-th position, $C_{min}$ is the minimum surface water content, and $C_{max}$ is the maximum surface water content.

Further, in step S3, the surface water content of the tunnel surrounding rock at different locations is determined according to the spectral peak data of the in-situ spectrum; in step S4, the joint development degree of the tunnel surrounding rock at different locations is calculated according to the variance of the scribing depth curve.

Further, in step S2, performing in-situ scribing on the tunnel cross-section using the scribing device to obtain the mechanical parameters of the tunnel surrounding rock, specifically includes:

Performing a penetration test on the tunnel cross-section by applying pressure to the scribing device, so that a vertical indenter within the scribing device is pressed into the tunnel cross-section, and the scribing device collects the indentation mechanical parameters of the surrounding rock;

Performing a scribing test on the tunnel cross-section by moving the scribing device, so that the vertical indenter within the scribing device scribes the tunnel cross-section, and the scribing device collects the scribing mechanical parameters of the surrounding rock.

According to a second aspect of the present invention, an apparatus for classifying water-rich weak surrounding rock based on in-situ scribing is provided, for implementing the method for classifying water-rich weak surrounding rock based on in-situ scribing according to any one of the preceding claims, including a scribing device, a near-infrared spectroscopy probe, a lateral gimbal, and a gantry rail, wherein the scribing device is slidably arranged on the lateral gimbal, the near-infrared spectroscopy probe is provided on the scribing device, the arched rail is placed in the tunnel cross-section, and the lateral gimbal is movably arranged on the arched rail along the shape of the arched rail.

Further, the scribing device includes a pipe wall, a vertical loading device, a vertical indenter, a back pressure plate, a vertical stress sensor, and a vertical strain sensor, wherein the vertical loading device is provided inside the pipe wall, the vertical indenter is provided inside the vertical loading device, the vertical indenter is restricted within a cavity of the vertical loading device by the back pressure plate, and the bottom of the cavity of the vertical loading device is provided with the vertical stress sensor and the vertical strain sensor.

Further, it also includes a pressurization hole and a back pressure hole, wherein the vertical loading device is a hollow cylindrical pipe body, the pipe wall of the vertical loading device is provided with the pressurization hole and the back pressure hole, and the pressurization hole and the back pressure hole are respectively connected to a hydraulic pump.

Further, the pipe wall is provided with a sealing cover, and the vertical loading device is sealed within the pipe wall by the sealing cover.

Further, the scribing device is provided with a gimbal numerically controlled wheel, the scribing device is slidably arranged on the lateral gimbal via the gimbal numerically controlled wheel, the lateral gimbal is provided with a rail numerically controlled wheel, the lateral gimbal is slidably arranged on the arched rail via the rail numerically controlled wheel, and the lateral gimbal is provided with a lateral stress sensor and a lateral strain sensor.

The present invention has the following advantages:

1. During the test process, the in-situ test can be performed on the surrounding rock at any position (planar direction and off-plane direction) of the tunnel cross-section by controlling the gimbal numerically controlled wheel and the rail numerically controlled wheel. The test process is efficient, the test method is refined, and the test results are reliable. The shape and specifications of the cone tip can be selectively processed according to engineering needs and the site rock conditions to obtain the required rock mechanical parameters, joint parameters, and mineral composition, etc.

2. It can realize simultaneous in-situ penetration tests, in-situ scribing, and near-infrared spectroscopy tests, and simultaneously obtain the joint development degree, rock strength, and water content. By evaluating the joint development degree, rock strength, and water content, and establishing a surrounding rock classification method based on in-situ three-parameter measurements, a design basis can be provided for the surrounding rock support and large deformation disaster control in water-rich soft rock tunnels.

3. It is simple to operate, highly efficient, and accurate in testing, and it can carry out surrounding rock mass tests under different rock mass conditions and at different locations, effectively saving time, labor, materials, and financial resources.

BRIEF DESCRIPTION OF THE DRAWINGS

In order to more clearly illustrate the embodiments of the present invention or the technical solutions in the prior art, the accompanying drawings that need to be used in the embodiments or the prior art description will be briefly introduced below. It is evident that the accompanying drawings in the following description are merely exemplary. For those skilled in the art, other implementation drawings can also be derived from the provided drawings without any creative work.

The structures, proportions, sizes, etc., depicted in this specification are only used to complement the content disclosed in the specification, for the understanding and reading of those familiar with this technology, and are not intended to limit the limiting conditions that can be implemented by the present invention. Therefore, they do not have substantial technical significance. Any modifications to the structure, changes in proportional relationships, or adjustments in size, which do not affect the effectiveness and objectives that can be achieved by the present invention, shall still fall within the scope of the technical content disclosed by the present invention.

In the figures:
1 Scribing device; 101 Pipe wall; 102 Vertical loading device; 103 Vertical indenter; 104 Back pressure plate; 105 Vertical stress sensor; 106 Vertical strain sensor; 2 Near-infrared spectroscopy probe; 3 Lateral gimbal; 4 Arched rail; 5 Pressurization hole; 6 Back pressure hole; 7 Sealing cover; 8 Gimbal numerically controlled wheel; 9 Rail numerically controlled wheel; 10 Lateral stress sensor; 11 Lateral strain sensor.

DETAILED DESCRIPTION OF THE EMBODIMENTS

The following specific embodiments are used to illustrate the implementation of the present invention. Those skilled in the art can easily understand other advantages and effects of the present invention from the content disclosed in this specification. Obviously, the described embodiments are part of the embodiments of the present invention, but not all of the embodiments. All other embodiments that a person of ordinary skill in the art could derive from the embodiments of the present invention without engaging in inventive activity are also within the scope of protection of the present invention.

Figure 1:
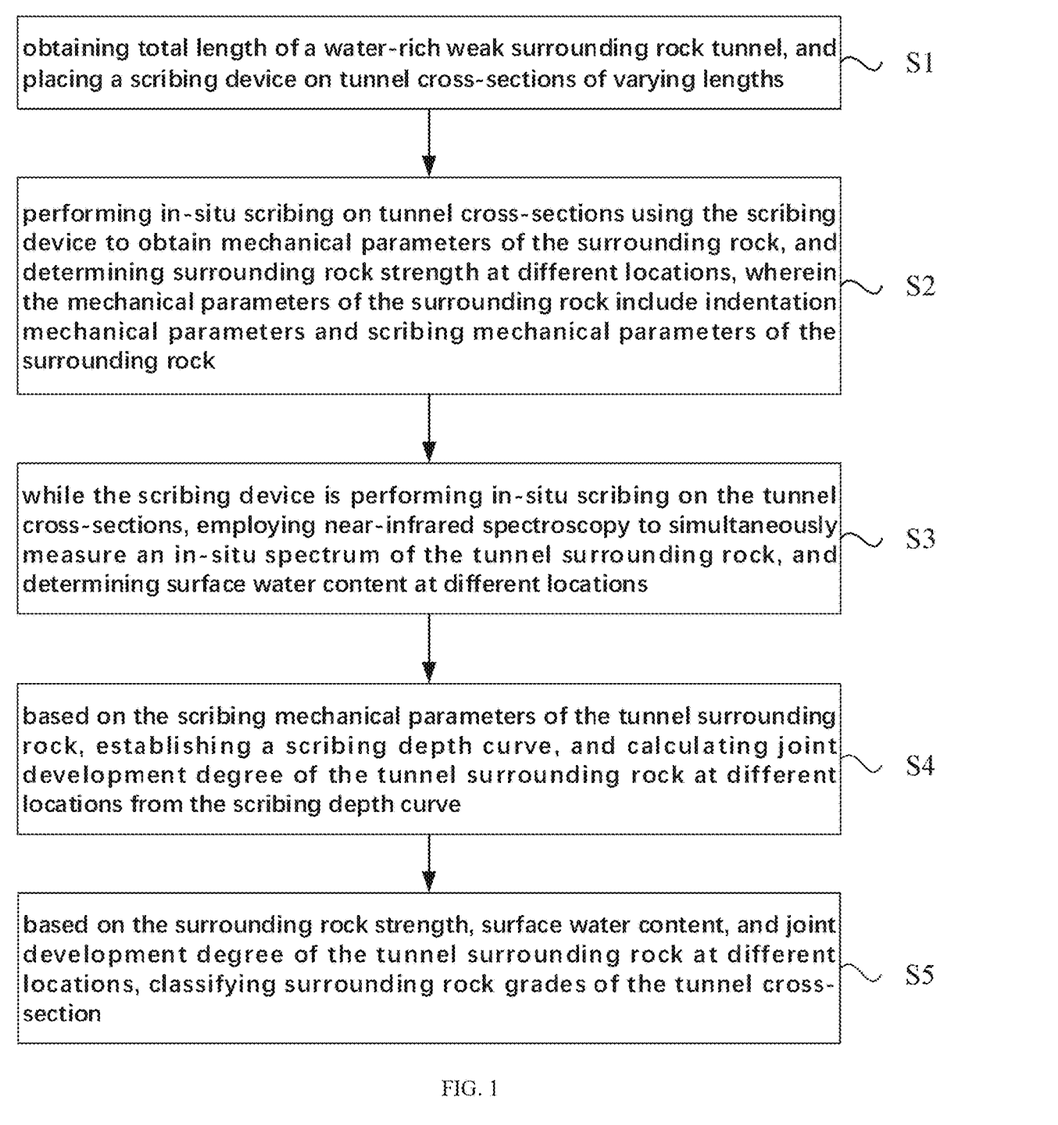
FIG. 1 is a flowchart of the classification method provided by the present invention.

According to a first aspect of the present invention, a method for classifying water-rich weak surrounding rock based on in-situ scribing is provided, as shown in FIG. 1, including the following steps:

Step S1: Obtain the total length of a water-rich weak surrounding rock tunnel and place a scribing device on tunnel cross-sections of varying lengths;

Step S2: Perform in-situ scribing on the tunnel cross-section using the scribing device to obtain mechanical parameters of the surrounding rock, and determine the surrounding rock strength at different locations, wherein the mechanical parameters of the surrounding rock include indentation mechanical parameters and scribing mechanical parameters of the surrounding rock.

Step S3: While the scribing device is performing in-situ scribing on the tunnel cross-sections, employ near-infrared spectroscopy to simultaneously measure the in-situ spectrum of the tunnel surrounding rock, and determine the surface water content at different locations;

Step S4: Based on the scribing mechanical parameters of the tunnel surrounding rock, establish a scribing depth curve, and calculate the joint development degree at different locations using the scribing depth curve;

Step S5: Based on the surrounding rock strength, surface water content, and joint development degree at various locations, classify the surrounding rock grades of the tunnel cross-section.

In the present invention, during the testing process, in-situ tests can be performed on the surrounding rock at any position (planar direction and off-plane direction) of the tunnel cross-section by controlling the gimbal numerically controlled wheel and the rail numerically controlled wheel. The test process is efficient, the test method is refined, and the test results are reliable. The shape and specifications of the cone tip can be selectively processed according to engineering needs and the site rock conditions to obtain the required rock mechanical parameters, joint parameters, and mineral composition, etc.

The present invention can realize simultaneous in-situ penetration tests, in-situ scribing, and near-infrared spectroscopy tests, and simultaneously obtain the joint development degree, rock strength, and water content. By evaluating the joint development degree, rock strength, and water content, and establishing a surrounding rock classification method based on in-situ three-parameter measurements, a design basis can be provided for the surrounding rock support and large deformation disaster control in water-rich soft rock tunnels.

The present invention is simple to operate, highly efficient, and accurate in testing, and it can carry out surrounding rock mass tests under different rock mass conditions and at different locations, effectively saving time, labor, materials, and financial resources.

In step S2, determining the surrounding rock strength of the tunnel surrounding rock at different locations, specifically includes:

Calculating an indentation elastic modulus $E_1$ and an indentation hardness $H_1$ according to the indentation mechanical parameters of the surrounding rock; wherein, $$E_1 = (1-v^2) \bigg/ \left( \frac{1}{E_r} + \frac{1-v^2}{E_i} \right), H_1 = P_{max}/A_c;$$

$v$ is the Poisson's ratio, $E_r$ is the reduced elastic modulus, $E_i$ is the indenter elastic modulus, $P_{max}$ is the maximum load, and $A_c$ is the indentation contact area between the vertical indenter and the rock;

Calculating a scribing elastic modulus $E_2$ and a scribing hardness $H_2$ according to the scribing mechanical parameters of the surrounding rock; wherein, $E_2 = dF_t/ds$, $H_2 = F_n/A_d$; $F_t$ is the lateral force, s is the lateral displacement, $F_n$ is the vertical force, and $A_d$ is the scribing contact area between the vertical indenter and the rock;

Calculating a surrounding rock elastic modulus E based on the indentation elastic modulus $E_1$ and the scribing elastic modulus $E_2$; wherein, $E = \sqrt{E_1 E_2}$;

Calculating a surrounding rock hardness H based on the indentation hardness $H_1$ and the scribing hardness $H_2$, wherein, $H = (H_1 + H_2)/2$;

Calculating the surrounding rock strength UCS based on the surrounding rock elastic modulus E and the surrounding rock hardness H; wherein, UCS=E/H.

Calculating the joint development degree DCD through the fluctuation of the scribing curve; inverting the surrounding rock water content C based on near-infrared spectroscopy; because surrounding rock with high strength, poor joint development, and low water content has a low risk of disasters, the surrounding rock strength, joint development degree, and water content are made dimensionless.

In step S5, the surrounding rock grades of the tunnel cross-section are classified based on the surrounding rock strength, surface water content, and joint development degree at different locations, according to a three-parameter evaluation model, wherein the three-parameter evaluation model is:

$$SRC = \overline{UCS} \big/ (\overline{DCD} * \overline{C});$$

$$\overline{UCS} = \frac{UCS_i - UCS_{min}}{UCS_{max} - UCS_{min}};$$

$$\overline{DCD} = \frac{DCD_i - DCD_{min}}{DCD_{max} - DCD_{min}};$$

$$\overline{C} = \frac{C_i - C_{min}}{C_{max} - C_{min}};$$

Wherein, SRC is the surrounding rock grade evaluation score, $\overline{UCS}$ is the standard surrounding rock strength, $\overline{DCD}$ is the standard joint development degree, $\overline{C}$ is the standard surface water content, $UCS_i$ is the surrounding rock strength of the tunnel surrounding rock at the i-th position, $UCS_{min}$ is the minimum surrounding rock strength, $UCS_{max}$ is the maximum surrounding rock strength, $DCD_i$ is the joint development degree of the tunnel surrounding rock at the i-th position, $DCD_{min}$ is the minimum joint development degree, $DCD_{max}$ is the maximum joint development degree, $C_i$ is the surface water content of the tunnel surrounding rock at the i-th position, $C_{min}$ is the minimum surface water content, and $C_{max}$ is the maximum surface water content.

In step S3, the surface water content of the tunnel surrounding rock at different locations is determined according to the peak height, right peak width, and spectral area of the in-situ spectrum; in step S4, the joint development degree of the tunnel surrounding rock at different locations is calculated according to the variance of the scribing depth curve.

In step S2, performing in-situ scribing on the tunnel cross-section using the scribing device to obtain the mechanical parameters of the surrounding rock, specifically includes:

Performing a penetration test on the tunnel cross-section by applying pressure to the scribing device, so that the vertical indenter within the scribing device is pressed into the tunnel cross-section, and the vertical stress sensor and the vertical strain sensor within the scribing device collect the indentation mechanical parameters of the surrounding rock;

Performing a scribing test on the tunnel cross-section by moving the scribing device on the lateral gimbal, so that the vertical indenter within the scribing device scribes the tunnel cross-section, and the lateral stress sensor on the lateral gimbal and the lateral strain sensor within the scribing device collect the scribing mechanical parameters of the surrounding rock.

The penetration test method includes a constant stress mode and a constant depth mode.

The constant stress mode includes:

Stress loading stage: In the initial stage of penetration, the vertical indenter within the scribing device is initially pressed into the tunnel cross-section, and the stress of the vertical indenter is increased;

Stress holding stage: The stress of the vertical indenter is maintained, and elastic deformation and plastic deformation occur in the tunnel cross-section, and the change in the penetration depth of the vertical indenter within the scribing device is observed;

Stress unloading stage: The stress of the vertical indenter is unloaded, the elastic deformation portion of the tunnel cross-section recovers, and the change in the penetration depth of the vertical indenter within the scribing device is observed.

The constant depth mode includes:

Continuous penetration stage: In the initial stage of penetration, the vertical indenter within the scribing device is initially pressed into the tunnel cross-section, the penetration depth of the vertical indenter is increased, and the change in the stress of the vertical indenter is observed;

Depth holding stage: The penetration depth of the vertical indenter is maintained, and the change in the penetration depth of the vertical indenter within the scribing device is observed.

The scribing test includes a surface pre-scanning stage, a scribing stage, and a post-scanning stage.

The in-situ scribing experiment is completed in three stages. The first stage is the sample surface pre-scanning stage. Under a small normal load, the indenter is pre-scanned according to the set scribing distance, mainly to detect the surface roughness of the rock and evaluate the rationality of the normal depth in the subsequent scribing stage. The second stage is the scribing stage, that is, the indenter is pressed into the sample surface under the action of a continuously increasing normal load, and at the same time, the indenter scribes forward, and the corresponding relationship between the normal and lateral loads and the indentation depth and scribing distance is obtained. The final stage is the post-scanning stage, that is, after the second stage is completed, the indenter scans the central area of the scribing mark again under the same normal load as the first stage, in order to characterize its elastic recovery and degree of damage.

Figure 4:
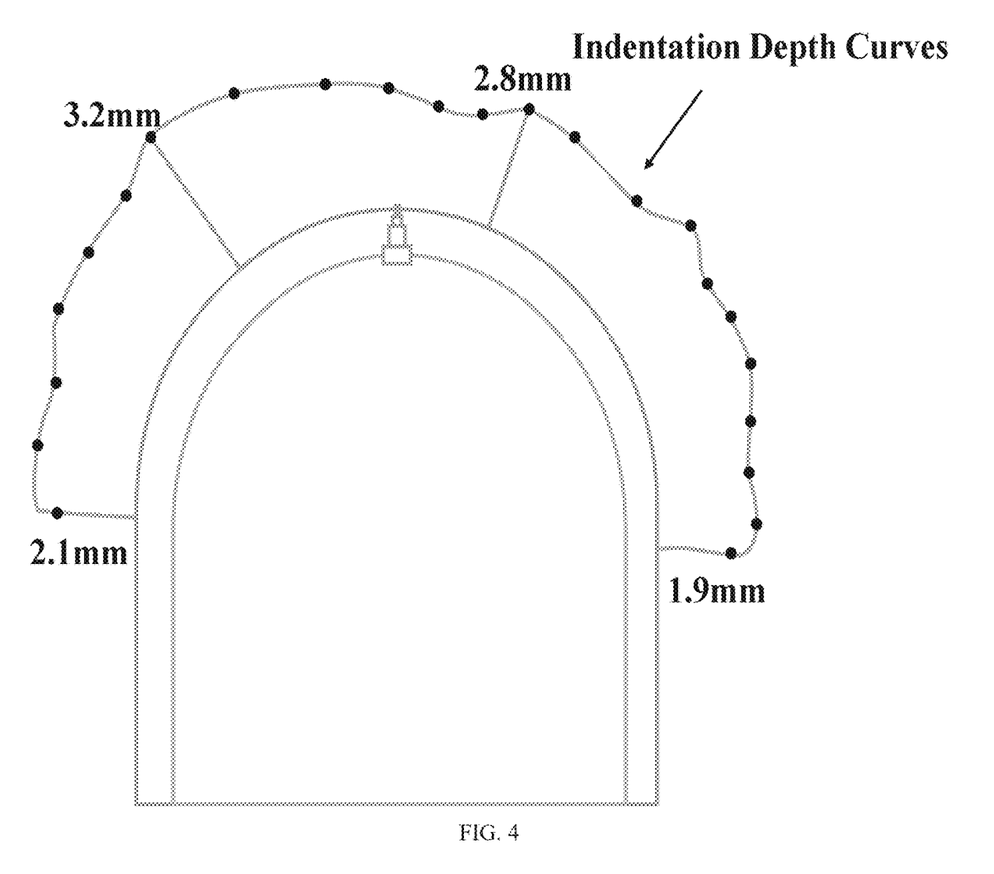
FIG. 4 is an indentation depth curve diagram in the classification method provided by the present invention.
Figure 5:
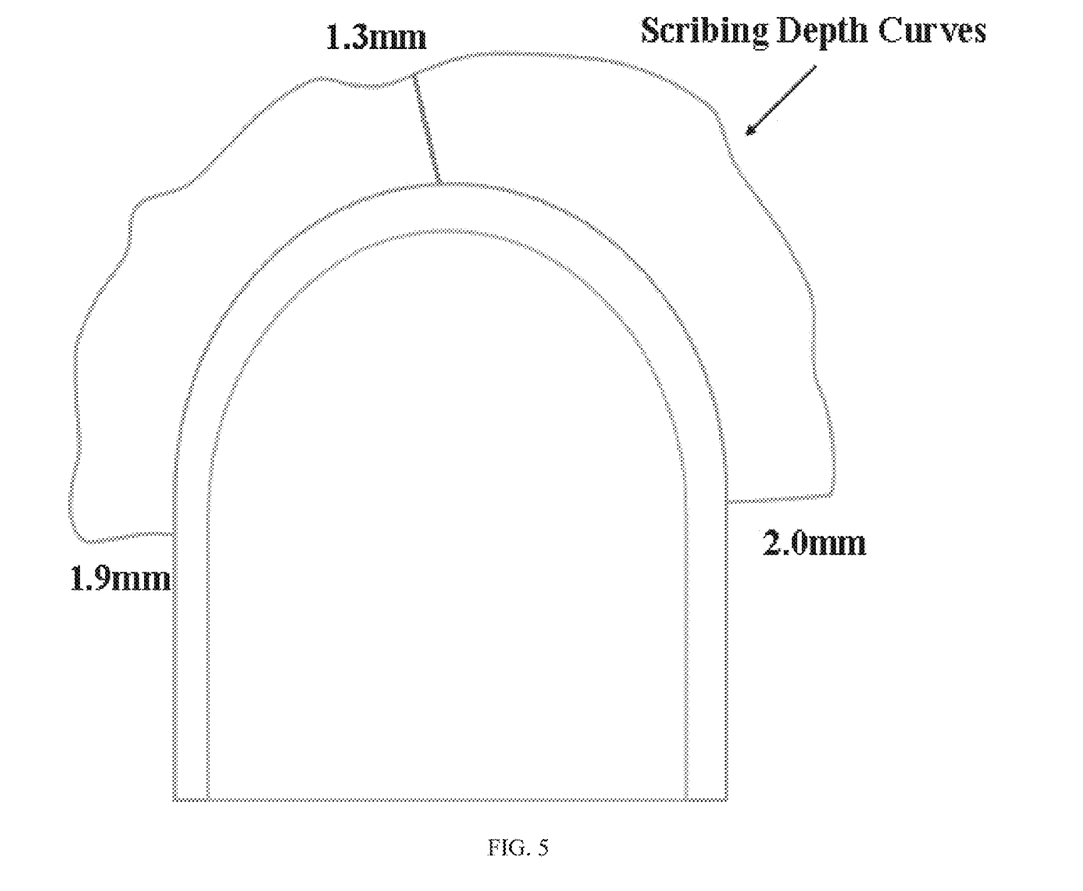
FIG. 5 is a scribing depth curve diagram in the classification method provided by the present invention.
Figure 6:
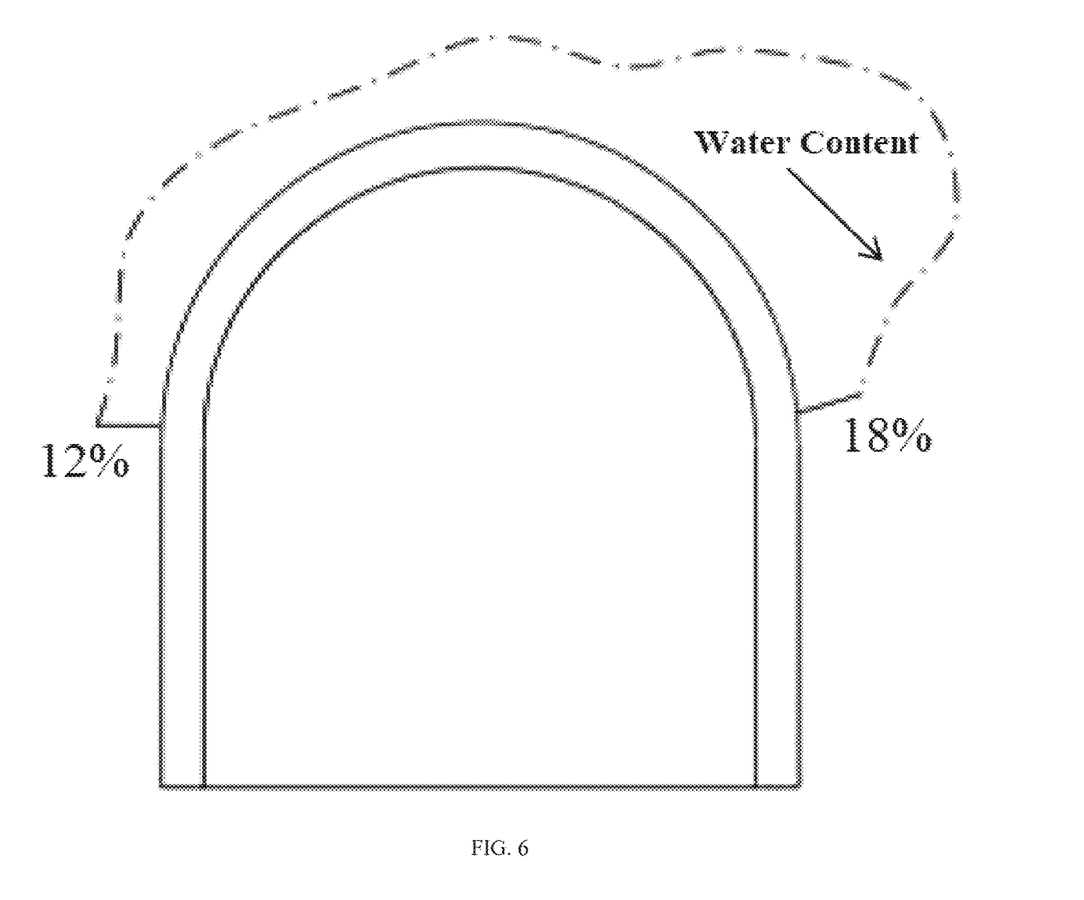
FIG. 6 is a water content curve diagram in the classification method provided by the present invention.

As shown in FIG. 4, based on the penetration test method, the indentation depths at different positions of the tunnel cross-section are obtained, and the indentation depth curves in different directions of the tunnel cross-section are determined. As shown in FIG. 5, based on the scribing test method, the scribing depths at different positions of the tunnel cross-section are obtained, and the scribing depth curves in different directions of the tunnel cross-section are determined. As shown in FIG. 6, based on the far-infrared spectroscopy measurement that is synchronously performed during in-situ scribing, the water content at different positions of the tunnel cross-section is obtained, and the water content curves in different directions of the tunnel cross-section are established.

Figure 7:
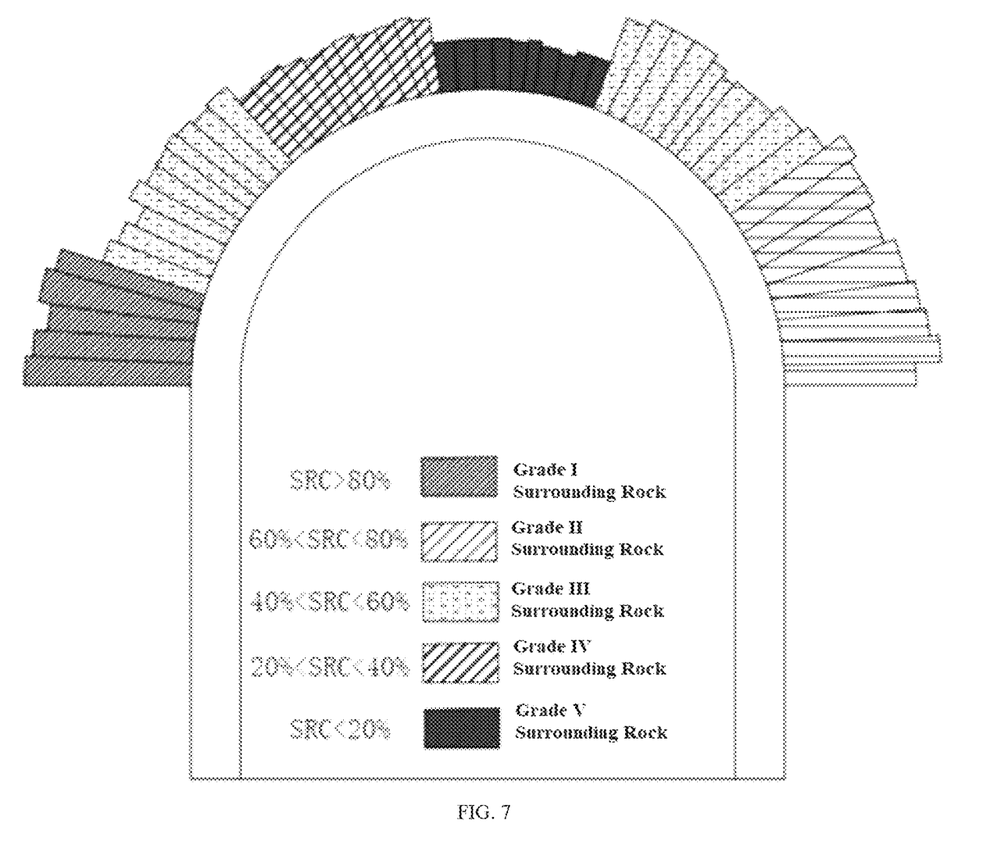
FIG. 7 is a surrounding rock classification curve diagram in the classification method provided by the present invention.

As shown in FIG. 7, according to the measured surrounding rock strength, joint development degree, and water content, the surrounding rock grade evaluation score of the tunnel cross-section is calculated, so as to classify the surrounding rock of the tunnel cross-section, and to provide a design basis for the surrounding rock support and large deformation disaster control in water-rich soft rock tunnels. When the surrounding rock grade evaluation score is greater than 80%, the surrounding rock grade at this position is evaluated as Grade I surrounding rock; when the surrounding rock grade evaluation score is less than 80% and greater than 60%, the surrounding rock grade at this position is evaluated as Grade II surrounding rock; when the surrounding rock grade evaluation score is less than 60% and greater than 40%, the surrounding rock grade at this position is evaluated as Grade III surrounding rock; when the surrounding rock grade evaluation score is less than 40% and greater than 20%, the surrounding rock grade at this position is evaluated as Grade IV surrounding rock; when the surrounding rock grade evaluation score is less than 20%, the surrounding rock grade at this position is evaluated as Grade V surrounding rock. Based on the surrounding rock grade at the same position of the tunnel cross-section, the tunnel surrounding rock support structure is designed.

Because of the strong heterogeneity of rocks, the data are quite discrete, and it is necessary to analyze the penetration and surrounding rock scribing data from multiple cross-sections for advanced prediction. For example, starting from the tunnel starting stake, surrounding rock penetration and scribing experiments are performed every 5 meters, and the prediction accuracy is largely determined by the number of experiments.

According to the field experiments, performing surrounding rock penetration and scribing experiments every 5 meters for a 50-meter long tunnel section can effectively predict the surrounding rock grades of each area of the arch within a range of 5 meters ahead; performing the experiments every 100 meters for a 1000-meter long tunnel section can effectively predict the surrounding rock grades of each area of the arch within a range of 100 meters ahead.

Although the the data exhibit significant scatter, from the perspective of the macroscopic tunnel trend, they still have regularity. Although the dividing points of different surrounding rock grades are not obvious, the transition trend can be seen, thereby allowing the prediction of the surrounding rock strength of the forward construction area.

Figure 2:
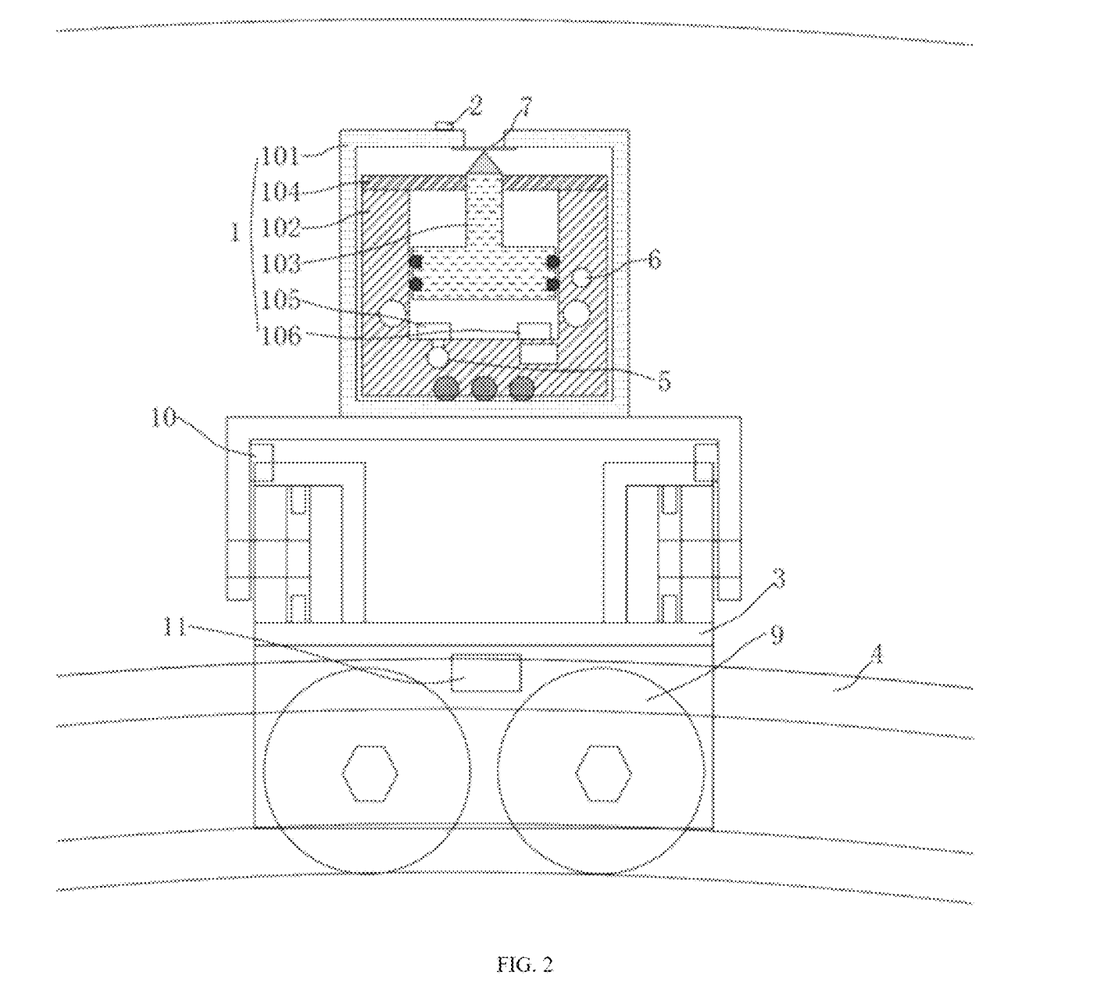
FIG. 2 is a front view of the classification apparatus provided by the present invention.

According to a second aspect of the present invention, an apparatus for classifying water-rich weak surrounding rock based on in-situ scribing is provided for implementing a method for classifying water-rich weak surrounding rock based on in-situ scribing. As shown in FIG. 2, the apparatus includes a scribing device 1, a near-infrared spectroscopy probe 2, a lateral gimbal 3, and a arched rail 4. The scribing device 1 is slidably arranged on the lateral gimbal 3, the near-infrared spectroscopy probe 2 is provided on the scribing device 1, the arched rail 4 is placed in the tunnel cross-section, and the lateral gimbal 3 is movably arranged on the arched rail 4 along the shape of the arched rail.

The scribing device 1 includes a pipe wall 101, a vertical loading device 102, a vertical indenter 103, a back pressure plate 104, a vertical stress sensor 105, and a vertical strain sensor 106. The vertical loading device 102 is provided inside the pipe wall 101, the vertical indenter 103 is provided inside the vertical loading device 102, the vertical indenter 103 is restricted within the cavity of the vertical loading device 102 by the back pressure plate 104, and the bottom of the cavity of the vertical loading device 102 is provided with the vertical stress sensor 105 and the vertical strain sensor 106.

It also includes a pressurization hole 5 and a back pressure hole 6. The vertical loading device 102 is a hollow cylindrical pipe body, and the pipe wall 101 of the vertical loading device 102 is provided with the pressurization hole 5 and the back pressure hole 6. The pressurization hole 5 and the back pressure hole 6 are respectively connected to a hydraulic pump. By the cooperation of the hydraulic pump with the pressurization hole 5 and the back pressure hole 6, a constant load or a vibrating load is applied to the vertical indenter 103.

The pipe wall 101 is provided with a sealing cover 7, and the vertical loading device 102 is sealed within the pipe wall 101 by the sealing cover 7.

Figure 3:
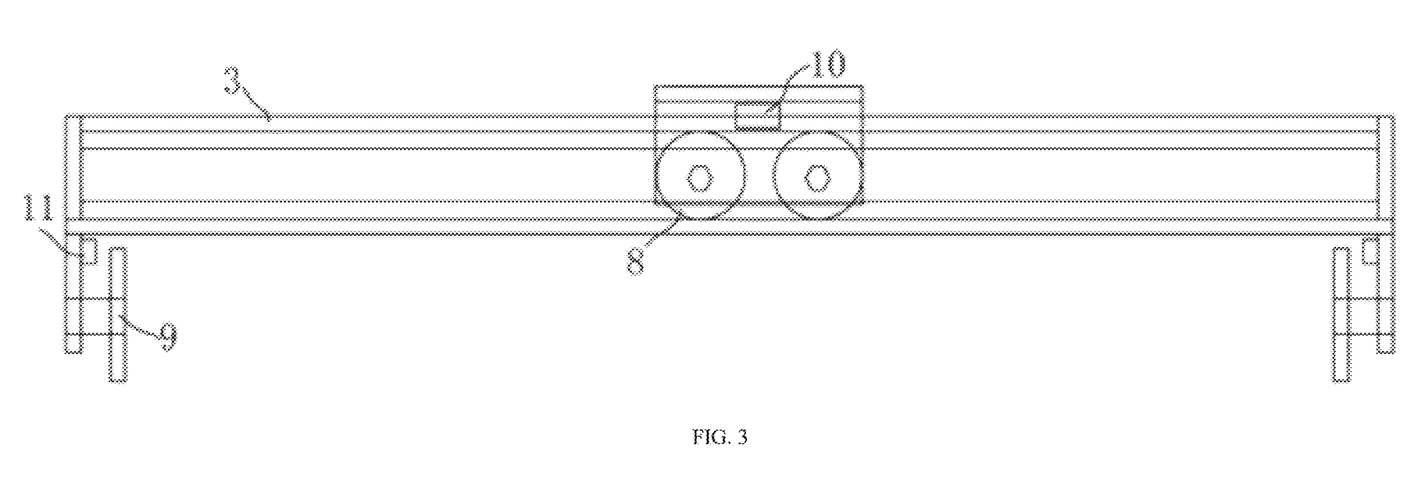
FIG. 3 is a front view of the lateral gimbal provided by the classification apparatus provided by the present invention.

As shown in FIG. 3, the scribing device 1 is provided with a gimbal numerically controlled wheel 8, and the scribing device 1 is slidably arranged on the lateral gimbal 3 through the gimbal numerically controlled wheel 8. The lateral gimbal 3 is provided with a rail numerically controlled wheel 9, and the lateral gimbal 3 is slidably arranged on the arched rail 4 through the rail numerically controlled wheel 9. The lateral gimbal 3 is provided with a lateral stress sensor 10 and a lateral strain sensor 11.

During the penetration test, when the scribing device 1 enters the predetermined test position, the sealing cover 7 on the upper part of the scribing device 1 is opened, and the hydraulic pump is pressurized so that the Berkovich indenter on the vertical indenter 103 protrudes outward. At the same time, the pipe wall 101 interacts with the hole wall to provide a reaction force. The vertical indenter 103 is connected to the vertical stress and strain sensors, so as to monitor and record real-time data. A pressure-displacement curve of the indenter can be obtained. By analysis, the deformation and mechanical parameters of the rock at this point can be obtained.

During the scribing test, the coordinates of the target position are input into the lateral gimbal 3, and the lateral gimbal 3 moves the scribing device 1 to the target position. Then, a loading stress is set on the lateral gimbal 3, and the scribing device 1 is pressed into the test rock mass by stress loading. Through the lateral gimbal 3, the gimbal numerically controlled wheel 8 is activated to move horizontally on the upper and lower guides of the gimbal for scribing testing. At the same time, the lateral sensor monitors the lateral stress and strain during the lateral movement. Combined with the vertical sensor monitoring data, the lateral gimbal 3 analyzes the data to obtain the mechanical parameters of the rock during the scribing experiment. Finally, the pressure is released through the back pressure hole 6, and the scribing device 1 is retracted.

During the monitoring process, by controlling the rail numerically controlled wheel 9 to move on the upper and lower guides of the steel arched and by controlling the gimbal numerically controlled wheel 8 to move on the upper and lower guides of the gimbal, penetration and scribing tests can be performed at any position and in any direction of the surrounding rock, and continuous displacement curves in two directions can be monitored. The entire process is convenient to operate, takes less time, is economical and practical, and the Berkovich indenter can be designed and processed according to the site and requirements to obtain the required rock parameters and distribution characteristics.

By controlling the rail numerically controlled wheel 9, the scribing device 1 is driven to move laterally on the arched rail 4. The moving distance should be kept the same as the moving distance during the previous measurement. Repeat the measurement operation to achieve the purpose of multi-segment continuous measurement, and then obtain the surrounding rock mechanical parameters of the entire cross-section of the tunnel.

Although the present invention has been described in detail above with general descriptions and specific embodiments, some modifications or improvements can be made to it based on the present invention, which is obvious to those skilled in the art. Therefore, such modifications or improvements made without departing from the spirit of the present invention shall all fall within the scope of protection requested by the present invention.

What is claimed is:

1. A method for classifying a water-rich weak surrounding rock based on in-situ scribing, comprising the following steps:
    step S1: obtaining a total length of a water-rich weak surrounding rock tunnel, and placing a scribing device on tunnel cross-sections of varying lengths;
    step S2: performing the in-situ scribing on the tunnel cross-sections using the scribing device to obtain mechanical parameters of a tunnel surrounding rock, and determining a surrounding rock strength at different locations, wherein the mechanical parameters of the tunnel surrounding rock comprise indentation mechanical parameters and scribing mechanical parameters of the tunnel surrounding rock;
    step S3: while the scribing device is performing the in-situ scribing on the tunnel cross-sections, employing a near-infrared spectroscopy to simultaneously measure an in-situ spectrum of the tunnel surrounding rock, and determining a surface water content at the different locations;
    step S4: based on the scribing mechanical parameters of the tunnel surrounding rock, establishing a scribing depth curve, and calculating a joint development degree of the tunnel surrounding rock at the different locations from the scribing depth curve; and
    step S5: based on the surrounding rock strength, the surface water content, and the joint development degree of the tunnel surrounding rock at the different locations, classifying surrounding rock grades of the tunnel cross-sections.

2. The method according to claim 1, wherein in the step S2, the step of determining the surrounding rock strength of the tunnel surrounding rock at the different locations comprises:
    calculating an indentation elastic modulus $E_1$ and an indentation hardness $H_1$ according to the indentation mechanical parameters of the tunnel surrounding rock; wherein $$E_1 = (1-v^2) \bigg/ \left( \frac{1}{E_r} + \frac{1-v^2}{E_i} \right), H_1 = P_{max}/A_c;$$

$v$ is a Poisson's ratio, $E_r$ is a reduced elastic modulus, $E_i$ is an indenter elastic modulus, $P_{max}$ is a maximum load, and $A_c$ is an indentation contact area between a vertical indenter and a rock;
    calculating a scribing elastic modulus $E_2$ and a scribing hardness $H_2$ according to the scribing mechanical parameters of the tunnel surrounding rock; wherein $E_2 = dF_t/ds$, $H_2 = F_n/A_d$; $F_t$ is a lateral force, $s$ is a lateral displacement, $F_n$ is a vertical force, and $A_d$ is a scribing contact area between the vertical indenter and the rock;
    calculating a surrounding rock elastic modulus E based on the indentation elastic modulus $E_1$ and the scribing elastic modulus $E_2$; wherein $E=\sqrt{E_1 E_2}$;
    calculating a surrounding rock hardness H based on the indentation hardness $H_1$ and the scribing hardness $H_2$; wherein $H=(H_1+H_2)/2$; and
    calculating the surrounding rock strength UCS based on the surrounding rock elastic modulus E and the surrounding rock hardness H; wherein UCS=E/H.

3. The method according to claim 1, wherein in the step S5, the surrounding rock grades of the tunnel cross-sections are classified according to a three-parameter evaluation model, wherein the three-parameter evaluation model is:

$$SRC = \overline{UCS} \big/ (\overline{DCD} * \overline{C});$$

$$\overline{UCS} = \frac{UCS_i - UCS_{min}}{UCS_{max} - UCS_{min}};$$

$$\overline{DCD} = \frac{DCD_i - DCD_{min}}{DCD_{max} - DCD_{min}};$$

$$\overline{C} = \frac{C_i - C_{min}}{C_{max} - C_{min}};$$

wherein SRC is a surrounding rock grade evaluation score, $\overline{UCS}$ is a standard surrounding rock strength, $\overline{DCD}$ is a standard joint development degree, $\overline{C}$ is a standard surface water content, $UCS_i$ is a surrounding rock strength of the tunnel surrounding rock at an $i^{th}$ position, $UCS_{min}$ is a minimum surrounding rock strength, $UCS_{max}$ is a maximum surrounding rock strength, $DCD_i$ is a joint development degree of the tunnel surrounding rock at the $i^{th}$ position, $DCD_{min}$ is a minimum joint development degree, $DCD_{max}$ is a maximum joint development degree, $C_i$ is a surface water content of the tunnel surrounding rock at the $i^{th}$ position, $C_{min}$ is a minimum surface water content, and $C_{max}$ is a maximum surface water content.

4. The method according to claim 1, wherein in the step S3, the surface water content of the tunnel surrounding rock at the different locations is determined according to spectral peak data of the in-situ spectrum; in the step S4, the joint development degree of the tunnel surrounding rock at the different locations is calculated according to a variance of the scribing depth curve.

5. The method according to claim 1, wherein in the step S2, the step of performing the in-situ scribing on the tunnel cross-sections using the scribing device to obtain the mechanical parameters of the tunnel surrounding rock comprises: performing a penetration test on the tunnel cross-sections by applying a pressure to the scribing device, wherein a vertical indenter within the scribing device is pressed into the tunnel cross-sections, and the scribing device collects the indentation mechanical parameters of the tunnel surrounding rock; and performing a scribing test on the tunnel cross-sections by moving the scribing device, wherein the vertical indenter within the scribing device scribes the tunnel cross-sections, and the scribing device collects the scribing mechanical parameters of the tunnel surrounding rock.

6. An apparatus for classifying a water-rich weak surrounding rock based on in-situ scribing, for implementing the method according to claim 1, comprising the scribing device, a near-infrared spectroscopy probe, a lateral gimbal, and an arched rail, wherein the scribing device is slidably arranged on the lateral gimbal, the near-infrared spectroscopy probe is provided on the scribing device, the arched rail is placed in the tunnel cross-sections, and the lateral gimbal is movably arranged on the arched rail along a shape of the arched rail; wherein the scribing device is provided with a gimbal numerically controlled wheel, the scribing device is slidably arranged on the lateral gimbal through the gimbal numerically controlled wheel, the lateral gimbal is provided with a rail numerically controlled wheel, the lateral gimbal is slidably arranged on the arched rail through the rail numerically controlled wheel, and the lateral gimbal is provided with a lateral stress sensor and a lateral strain sensor.

7. The apparatus according to claim 6, wherein the scribing device comprises a pipe wall, a vertical loading device, a vertical indenter, a back pressure plate, a vertical stress sensor, and a vertical strain sensor, wherein the vertical loading device is provided inside the pipe wall, the vertical indenter is provided inside the vertical loading device, the vertical indenter is restricted within a cavity of the vertical loading device by the back pressure plate, and a bottom of the cavity of the vertical loading device is provided with the vertical stress sensor and the vertical strain sensor.

8. The apparatus according to claim 7, further comprising a pressurization hole and a back pressure hole, wherein the vertical loading device is a hollow cylindrical pipe body, and a pipe wall of the vertical loading device is provided with the pressurization hole and the back pressure hole, and the pressurization hole and the back pressure hole are respectively connected to a hydraulic pump.

9. The apparatus according to claim 7, wherein the pipe wall is provided with a sealing cover, and the vertical loading device is sealed within the pipe wall by the sealing cover.

10. The apparatus according to claim 6, wherein in the step S2 of the method, the step of determining the surrounding rock strength of the tunnel surrounding rock at the different locations comprises:

calculating an indentation elastic modulus $E_1$ and an indentation hardness $H_1$ according to the indentation mechanical parameters of the tunnel surrounding rock; wherein $$E_1 = (1-v^2) / \left( \frac{1}{E_r} + \frac{1-v^2}{E_i} \right), H_1 = P_{max}/A_c;$$

v is a Poisson's ratio, $E_r$ is a reduced elastic modulus, $E_i$ is an indenter elastic modulus, $P_{max}$ is a maximum load, and $A_c$ is an indentation contact area between a vertical indenter and a rock;

calculating a scribing elastic modulus $E_2$ and a scribing hardness $H_2$ according to the scribing mechanical parameters of the tunnel surrounding rock; wherein $E_2 = dF_t/ds$, $H_2 = F_n/A_d$; $F_t$ is a lateral force, s is a lateral displacement, $F_n$ is a vertical force, and $A_d$ is a scribing contact area between the vertical indenter and the rock;

calculating a surrounding rock elastic modulus E based on the indentation elastic modulus $E_1$ and the scribing elastic modulus $E_2$; wherein $E=\sqrt{E_1 E_2}$;

calculating a surrounding rock hardness H based on the indentation hardness $H_1$ and the scribing hardness $H_2$; wherein $H=(H_1+H_2)/2$; and calculating the surrounding rock strength UCS based on the surrounding rock elastic modulus E and the surrounding rock hardness H; wherein UCS=E/H.

11. The apparatus according to claim 10, wherein the scribing device comprises a pipe wall, a vertical loading device, a vertical indenter, a back pressure plate, a vertical stress sensor, and a vertical strain sensor, wherein the vertical loading device is provided inside the pipe wall, the vertical indenter is provided inside the vertical loading device, the vertical indenter is restricted within a cavity of the vertical loading device by the back pressure plate, and a bottom of the cavity of the vertical loading device is provided with the vertical stress sensor and the vertical strain sensor.

12. The apparatus according to claim 11, further comprising a pressurization hole and a back pressure hole, wherein the vertical loading device is a hollow cylindrical pipe body, and a pipe wall of the vertical loading device is provided with the pressurization hole and the back pressure hole, and the pressurization hole and the back pressure hole are respectively connected to a hydraulic pump.

13. The apparatus according to claim 6, wherein in the step S5 of the method, the surrounding rock grades of the tunnel cross-sections are classified according to a three-parameter evaluation model, wherein the three-parameter evaluation model is:

$$SRC = \overline{UCS} / (\overline{DCD} * \overline{C});$$

$$\overline{UCS} = \frac{UCS_i - UCS_{min}}{UCS_{max} - UCS_{min}};$$

$$\overline{DCD} = \frac{DCD_i - DCD_{min}}{DCD_{max} - DCD_{min}};$$

$$\overline{C} = \frac{C_i - C_{min}}{C_{max} - C_{min}};$$

wherein SRC is a surrounding rock grade evaluation score, $\overline{UCS}$ is a standard surrounding rock strength, $\overline{DCD}$ is a standard joint development degree, $\overline{C}$ is a standard surface water content, $UCS_i$ is a surrounding rock strength of the tunnel surrounding rock at an $i^{th}$ position, $UCS_{min}$ is a minimum surrounding rock strength, $UCS_{max}$ is a maximum surrounding rock strength, $DCD_i$ is a joint development degree of the tunnel surrounding rock at the $i^{th}$ position, $DCD_{min}$ is a minimum joint development degree, $DCD_{max}$ is a maximum joint development degree, $C_i$ is a surface water content of the tunnel surrounding rock at the $i^{th}$ position, $C_{min}$ is a minimum surface water content, and $C_{max}$ is a maximum surface water content.

14. The apparatus according to claim 13, wherein the scribing device comprises a pipe wall, a vertical loading device, a vertical indenter, a back pressure plate, a vertical stress sensor, and a vertical strain sensor, wherein the vertical loading device is provided inside the pipe wall, the vertical indenter is provided inside the vertical loading device, the vertical indenter is restricted within a cavity of the vertical loading device by the back pressure plate, and a bottom of the cavity of the vertical loading device is provided with the vertical stress sensor and the vertical strain sensor.

15. The apparatus according to claim 14, further comprising a pressurization hole and a back pressure hole, wherein the vertical loading device is a hollow cylindrical pipe body, and a pipe wall of the vertical loading device is provided with the pressurization hole and the back pressure hole, and the pressurization hole and the back pressure hole are respectively connected to a hydraulic pump.

16. The apparatus according to claim 6, wherein in the step S3 of the method, the surface water content of the tunnel surrounding rock at the different locations is determined according to spectral peak data of the in-situ spectrum; in the step S4, the joint development degree of the tunnel surrounding rock at the different locations is calculated according to a variance of the scribing depth curve.

17. The apparatus according to claim 16, wherein the scribing device comprises a pipe wall, a vertical loading device, a vertical indenter, a back pressure plate, a vertical stress sensor, and a vertical strain sensor, wherein the vertical loading device is provided inside the pipe wall, the vertical indenter is provided inside the vertical loading device, the vertical indenter is restricted within a cavity of the vertical loading device by the back pressure plate, and a bottom of the cavity of the vertical loading device is provided with the vertical stress sensor and the vertical strain sensor.

18. The apparatus according to claim 17, further comprising a pressurization hole and a back pressure hole, wherein the vertical loading device is a hollow cylindrical pipe body, and a pipe wall of the vertical loading device is provided with the pressurization hole and the back pressure hole, and the pressurization hole and the back pressure hole are respectively connected to a hydraulic pump.

19. The apparatus according to claim 6, wherein in the step S2 of the method, the step of performing the in-situ scribing on the tunnel cross-sections using the scribing device to obtain the mechanical parameters of the tunnel surrounding rock comprises: performing a penetration test on the tunnel cross-sections by applying a pressure to the scribing device, wherein a vertical indenter within the scribing device is pressed into the tunnel cross-sections, and the scribing device collects the indentation mechanical parameters of the tunnel surrounding rock; and performing a scribing test on the tunnel cross-sections by moving the scribing device, wherein the vertical indenter within the scribing device scribes the tunnel cross-sections, and the scribing device collects the scribing mechanical parameters of the tunnel surrounding rock.

20. The apparatus according to claim 19, wherein the scribing device comprises a pipe wall, a vertical loading device, a vertical indenter, a back pressure plate, a vertical stress sensor, and a vertical strain sensor, wherein the vertical loading device is provided inside the pipe wall, the vertical indenter is provided inside the vertical loading device, the vertical indenter is restricted within a cavity of the vertical loading device by the back pressure plate, and a bottom of the cavity of the vertical loading device is provided with the vertical stress sensor and the vertical strain sensor.

* * * * *